(12) United States Patent
Jung

(10) Patent No.: US 10,814,703 B2
(45) Date of Patent: Oct. 27, 2020

(54) INTEGRATED OUTSIDE HANDLE SWITCH ASSEMBLY FOR A TAIL GATE

(71) Applicants: HYUNDAI MOTOR COMPANY, Seoul (KR); KIA MOTORS CORPORATION, Seoul (KR)

(72) Inventor: Yun-Hee Jung, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/670,424

(22) Filed: Oct. 31, 2019

(65) Prior Publication Data

US 2020/0180408 A1 Jun. 11, 2020

(30) Foreign Application Priority Data

Dec. 5, 2018 (KR) .................. 10-2018-0155403

(51) Int. Cl.
*B60Q 1/56* (2006.01)
*B60J 5/10* (2006.01)
*B60R 11/04* (2006.01)
*B60R 11/00* (2006.01)
*E05B 85/10* (2014.01)

(52) U.S. Cl.
CPC .............. *B60J 5/10* (2013.01); *B60Q 1/56* (2013.01); *B60R 11/04* (2013.01); *B60R 2011/004* (2013.01); *E05B 85/10* (2013.01); *E05Y 2900/546* (2013.01)

(58) Field of Classification Search
CPC ........... B60Q 1/56; B60R 11/04; E05B 85/10; E05Y 2900/546
See application file for complete search history.

(56) References Cited

U.S. PATENT DOCUMENTS

| 8,128,265 | B2* | 3/2012 | Shamitz ............. B60Q 1/56 362/497 |
| 9,045,083 | B2* | 6/2015 | Harrop ............. B60Q 1/2669 |
| 9,586,622 | B2* | 3/2017 | Yamaguchi ........ B62D 33/06 |
| 9,688,190 | B1* | 6/2017 | Johnson ............ B60R 13/10 |
| 2007/0216770 | A1* | 9/2007 | Chang ................ H04N 7/183 348/148 |
| 2010/0129070 | A1* | 5/2010 | Balasundaramohan .... G03B 17/00 396/419 |
| 2016/0107571 | A1* | 4/2016 | Dellock ............. B60R 11/04 348/148 |

FOREIGN PATENT DOCUMENTS

KR 100868154 B1 11/2008

* cited by examiner

*Primary Examiner* — Julie A Bannan
(74) *Attorney, Agent, or Firm* — Lempia Summerfield Katz LLC

(57) ABSTRACT

An integrated outside handle switch assembly for a rear trunk lid or tail gate is mounted in the rear trunk lid or tail gate and is operated at the time of opening the tail gate. The outside handle switch assembly may include: an upper housing configured to be mounted on the tail gate; a lower housing configured to be assembled to the upper housing below the upper housing; a substrate configured to be fixed at a lower portion of the upper housing; a switch configured to be operated at the time of opening the tail gate and mounted on the substrate; and a lamp configured to illuminate a license plate attached to the tail gate and be mounted on the substrate.

8 Claims, 6 Drawing Sheets

INTEGRATED OUTSIDE HANDLE SWITCH ASSEMBLY FOR A TAIL GATE

CROSS-REFERENCE(S) TO RELATED APPLICATIONS

This application claims priority to Korean Patent Application No. 10-2018-0155403, filed on Dec. 5, 2018, which is incorporated herein by reference in its entirety.

BACKGROUND OF THE DISCLOSURE

Field of the Disclosure

Embodiments of the present disclosure relate to an outside handle switch assembly for a tail gate which is used for opening the tail gate of a vehicle, and more particularly, to an integrated outside handle switch assembly for a tail gate in which a rear camera and a license plate lamp are integrally formed.

Description of Related Art

A tail gate or trunk lid for loading cargos is formed at a rear of a vehicle.

A tail gate handle is applied to open the tail gate or the trunk lid.

In addition, a license plate lamp is mounted to illuminate a license plate attached to the tail gate or the trunk lid, and a camera is mounted to provide a view to a rear of the vehicle.

In the related art, as shown in FIG. 1, a tail gate 2 of a vehicle 1 has a structure in which an outside handle switch assembly 110 for opening the tail gate 2 and a license plate lamp 120 for illuminating a license plate 3 are mounted separately.

The outside handle switch assembly 110 has a structure as shown in FIG. 2. A substrate 113 is installed between an upper housing 111 and a lower housing 112. A switch 114 for inputting an operation of a user is installed on the substrate 113. An actuator 116 is installed between the switch 114 and the lower housing 112. Since the lower housing 112 is formed of a rubber material and the switch 114 is provided in the form of a tact switch, when the user presses the lower housing 112, the switch 114 is operated through the actuator 116. When an operation signal of the user is transferred to a controller (not shown) through a wiring 115 connected to the switch 114, a latch of the tail gate is operated and the tail gate 2 may be opened. A camera 117 providing a view to a rear of the vehicle is installed in one side of the upper housing 111. A reference numeral 119 (not described) is an adhesive.

As described above, the outside handle switch assembly 110 for the tail gate in the related art has a structure in which the rear camera 117 is integrally formed with the outside handle switch assembly 110, but the license plate lamp 120 is mounted separately. Thus, there is a problem that the outside handle switch assembly 110 and the license plate lamp 120 are separately mounted on the tail gate 2, thereby increasing assembly stages.

In addition, since the outside handle switch assembly 110 and the license plate lamp 120 are separately mounted, separate wiring is be provided for both the outside handle switch assembly 110 and the license plate lamp 120 and is thus assembled in individually or separately.

SUMMARY OF THE DISCLOSURE

The present disclosure is made to solve the above problems. An object of the present disclosure is to provide an integrated type outside handle switch assembly for a tail gate. The outside handle switch assembly includes, as an assembly, a rear camera for providing a view to a rear of the vehicle and a license plate lamp for illuminating a license plate in an outside handle for opening a tail gate of a vehicle and a trunk lid.

In order to achieve the above object, an integrated type outside handle switch assembly for a tail gate according to the present disclosure is mounted in the tail gate, is opened and closed rearward of a vehicle, and is operated at the time of opening the tail gate. The assembly includes an upper housing configured to be mounted on the tail gate, a lower housing configured to be assembled to the upper housing below the upper housing, a substrate configured to be fixed at a lower portion of the upper housing, a switch configured to be operated at the time of opening the tail gate and to be mounted on the substrate, and a lamp configured to illuminate a license plate attached to the tail gate and to be mounted on the substrate.

A camera for providing a view to a rear of the vehicle may be mounted on the upper housing. The substrates may be installed on left and right sides of the camera, respectively.

The substrates may be electrically connected to each other.

The substrates may be connected to each other by a cable.

An actuator transferring to the switch an operating force input to the lower housing may be mounted between the lower housing and the substrate.

The actuator may be provided with a body in contact with the lower housing and with supports extending upward from both ends of the body to the switch, respectively.

The actuator may be provided with an extension portion extending in a cantilever form from the body to one side. The lower housing may house the extension portion and may be provided with a guide that guides, lifts, and lowers the extension portion at the time of operating the actuator.

The extension portion may extend toward the rear of the vehicle.

The extension portions may be formed at both ends of the body, respectively. The guides may be formed in the lower housing so as to be spaced apart from each other.

The camera may be installed at a center of the upper housing in a width direction of the vehicle.

The upper housing may be mounted above the license plate in the tail gate.

According to the integrated type outside handle switch assembly for a tail gate of the present disclosure having the above configuration, since the license plate lamp is integrally formed in the outside handle switch assembly, a separate process is not required for installing the license plate lamp at the time of assembling.

Furthermore, the switch, the rear camera, and the license plate lamp are assembled in one assembly. Thus, the assembly facilitates using common wiring, reducing the number of wirings, and connecting the wiring.

In addition, when the user operates the actuator to open the tail gate and the trunk lid, the actuator is not deformed by an operating force.

DESCRIPTION OF SPECIFIC EMBODIMENTS

Hereinafter, an integrated type outside handle switch assembly for a tail gate according to the present disclosure is described in detail with reference to the accompanying drawings.

Figure 1:
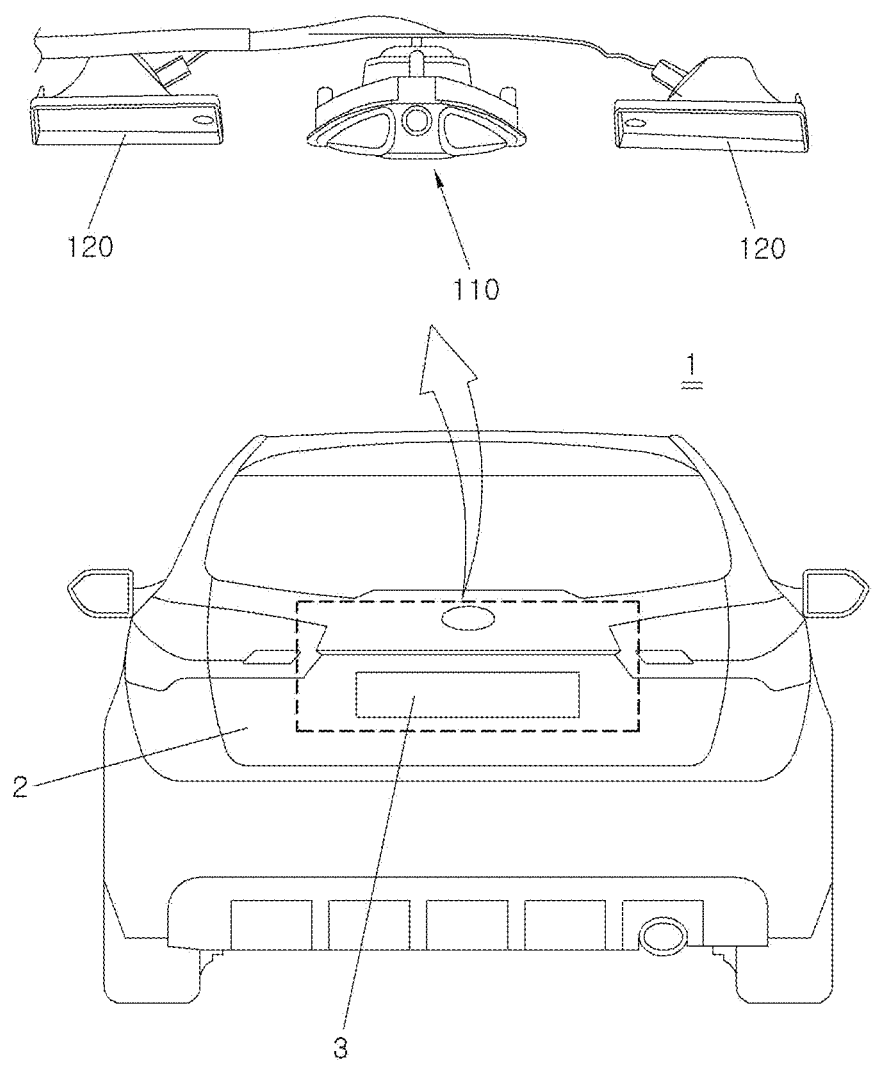
FIG. 1 is a schematic view showing a state in which an outside handle and a license plate lamp of the related art are separately installed at a rear of a vehicle.
Figure 2:
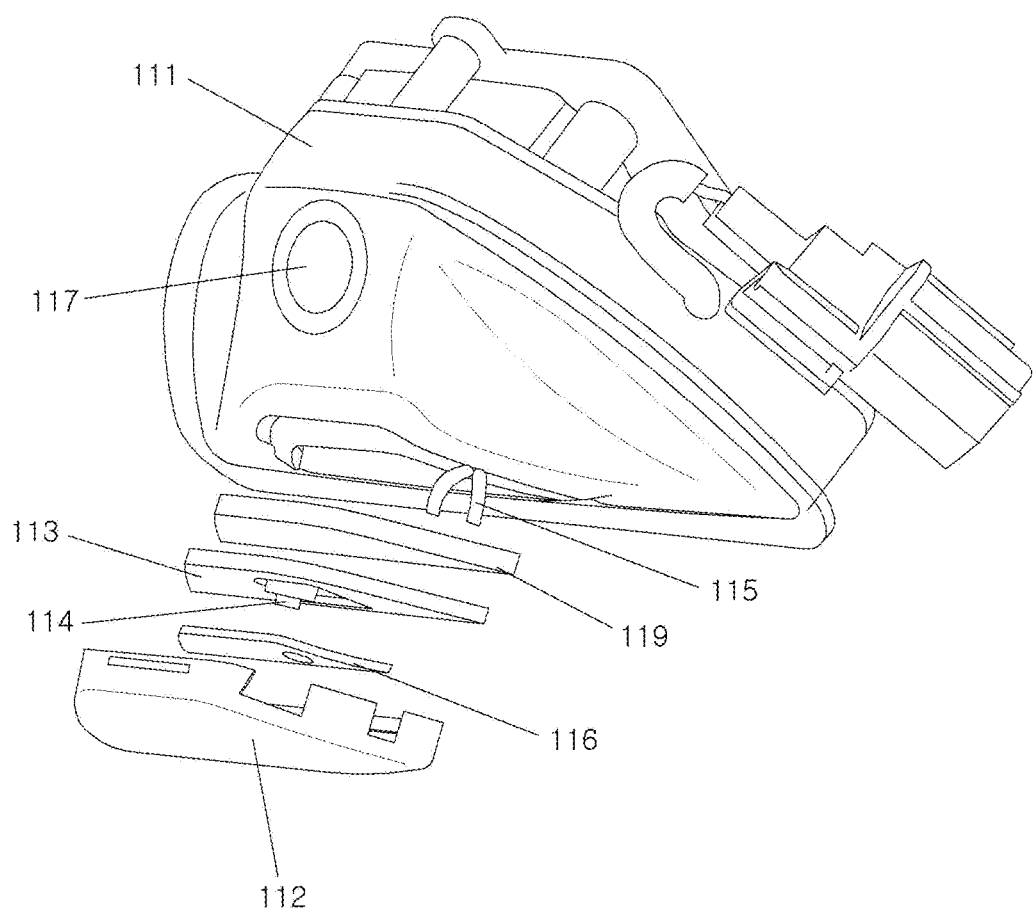
FIG. 2 is an exploded perspective view showing an outside handle for a tail gate according to the related art.
Figure 3:
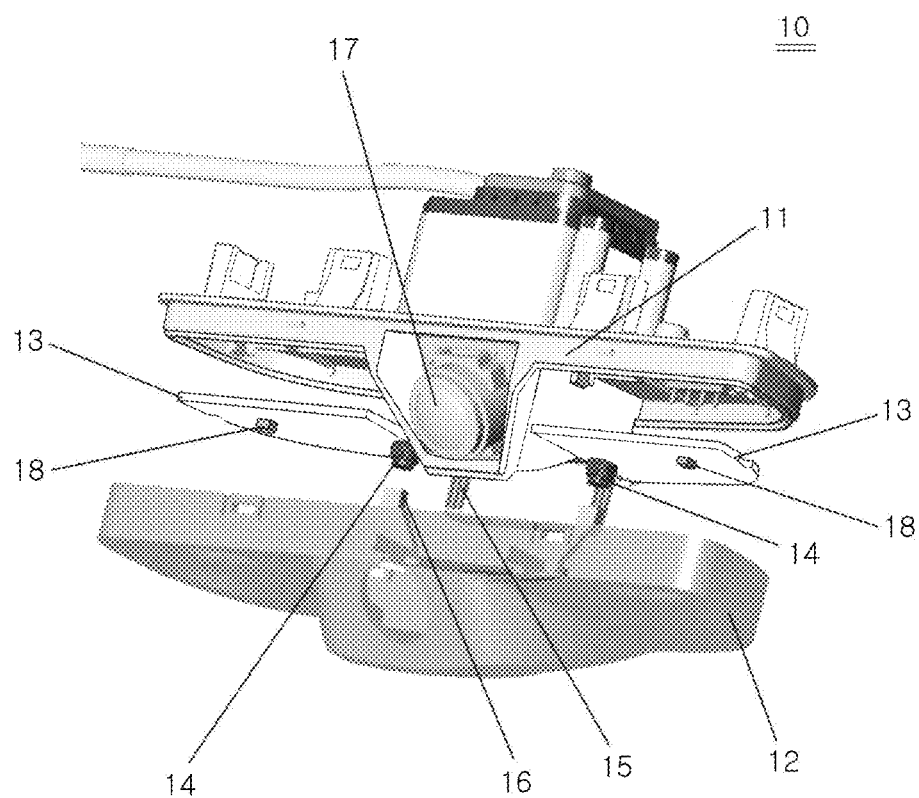
FIG. 3 is an exploded perspective view showing an integrated type outside handle switch assembly for a tail gate according to the present disclosure.

As shown in FIG. 3, an integrated type outside handle switch assembly for a tail gate according to the present disclosure is mounted on a tail gate 2, which is opened and closed rearward of a vehicle 1 and is operated at the time of opening the tail gate 2. The assembly includes an upper housing 11 mounted in the tail gate 2, a lower housing 12 assembled to the upper housing 11 below the upper housing 11, substrates 13 fixed at a lower portion of the upper housing 11, switches 14 operated at the time of opening the tail gate 2 and mounted on the substrates 13, and lamps 18 illuminating a license plate 3 attached to the tail gate 2 and mounted on the substrates 13.

The upper housing 11 is assembled to the tail gate 2 of the vehicle. The substrates 13 and a camera 17 (which are described below) are mounted in the upper housing 11. The upper housing 11 may be injection molded using a synthetic resin material. The upper housing 11 is mounted in the middle of the tail gate 2 of the vehicle, such as above the license plate 3.

The lower housing 12 is coupled to a lower portion of the upper housing 11.

In one example, the lower housing 12 is formed of a rubber a material. Since the lower housing 12 is formed of a rubber material, which is elastically deformable, even if a user presses one side of the lower housing 12 to open the tail gate 2, it may be returned to an original state after the operation is performed.

The upper housing 11 and the lower housing 12 are coupled to each other to form an appearance of the integrated type outside handle switch assembly 10 for a tail gate according to the present disclosure. The constituting elements (which are described below) are mounted between the upper housing 11 and the lower housing 12.

The camera 17 is installed in the upper housing 11 and provides a view to the rear of the vehicle. In one example, the camera 17 is installed in the middle of the upper housing 11, such as at the center of the upper housing 11 in a width direction of the vehicle. By positioning the camera 17 at the center of the vehicle, the camera 17 may provide a uniform view to the rear of the vehicle.

The substrates 13 are mounted below the upper housing 11. Since the camera 17 is installed in the middle of the upper housing 11, the substrates 13 are installed while avoiding the camera 17. In one example, the substrates 13 are installed at both sides, respectively, of the camera 17 in the upper housing 11. In one example, as described below, the lamps 18 for illuminating the license plate are mounted on the substrates 13 so that the substrates 13 are installed at both sides, respectively, of the camera 17 in the upper housing 11 so as to be symmetrical to each other.

The switch 14, operated by a user at the time of operating the outside handle switch assembly 10 in order for the user to open the tail gate 2, and the lamp 18, for illuminating the license plate attached to the tail gate 2, are mounted on the substrate 13.

The switch 14 and the lamp 18 are mounted together on one substrate 13, Thus, the substrate 13 may be shared with each other. In addition, all of the switch 14, the camera 17, and the lamp 18 are provided in the outside handle switch assembly 10 by mounting the lamp 18 on the substrate 13 instead of mounting separately the lamp 18 at both sides of the outside handle switch assembly 10. Thus, the respective license plate lamps separately installed on both sides of the outside handle may be provided in one package.

If there is a press operation, the switch 14 may be a tact switch outputting a signal by sensing the press operation.

The lamp 18 may be a light emitting diode (LED) lamp.

The substrates 13 are electrically connected to each other. The substrates are spaced apart from each other with the camera 17 interposed therebetween. The substrates may be electrically connected to each other through a cable 15. The substrates 13 are installed at both sides, respectively, of the camera 17 around the camera 17 so that the substrates 13 are connected to each other by using the cable 15. When the spaced substrates 13 are connected to each other by using the cable 15, the camera 17 is positioned in the middle of the upper housing. Thus, the cable 15 may be provided having a U shape by avoiding the camera 17.

One of the substrates 13 is connected to a connector for controlling an operation of the outside handle switch assembly 10 or for supplying power. Since the substrates 13 are connected to each other by the cables 15, only one substrate 13 may be connected to the connector.

When an operating force of the user is input through the lower housing 12, the actuator 16 transfers the operating force to the switch 14.

The actuator 16 includes a body 16a in contact with the lower housing 12 and a support 16b extending upward from the body 16a toward the switch 14.

The body 16a is formed in a predetermined area so that the user may easily press the body 16a. A bottom surface of the body 16a is in contact with the lower housing 12 or spaced apart from the lower housing by a gap. When the user presses one side of the lower housing 12, the actuator 16 transfers the operation to the body 16a.

Figure 4A:
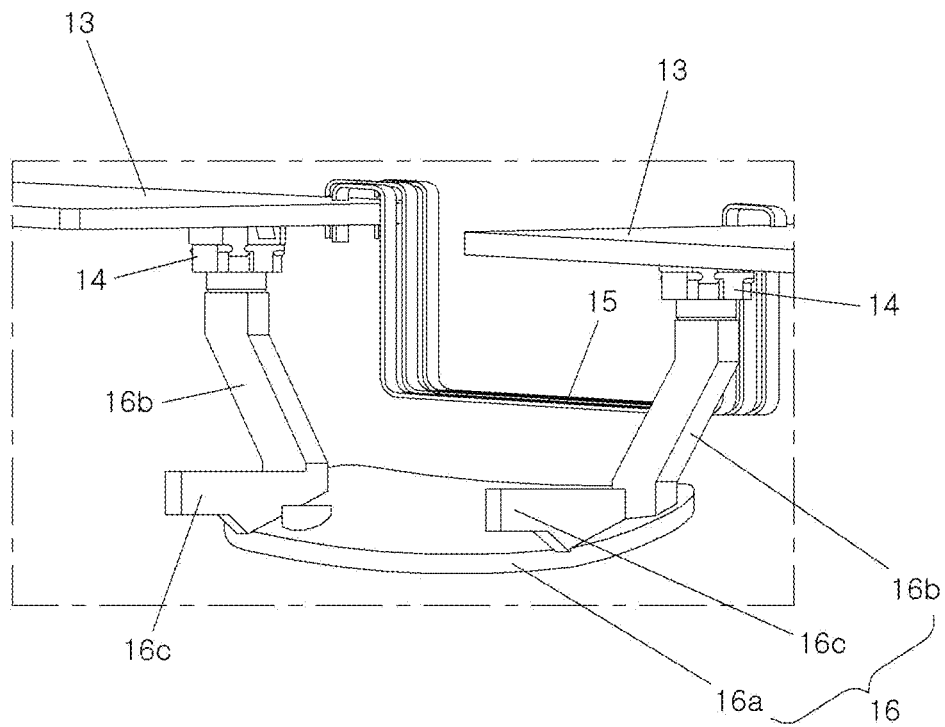
FIGS. 4A and 4B are perspective views showing a state in which an actuator is not operated and is operated, respectively, in the integrated type outside handle switch assembly for a tail gate according to the present disclosure.
Figure 4B:
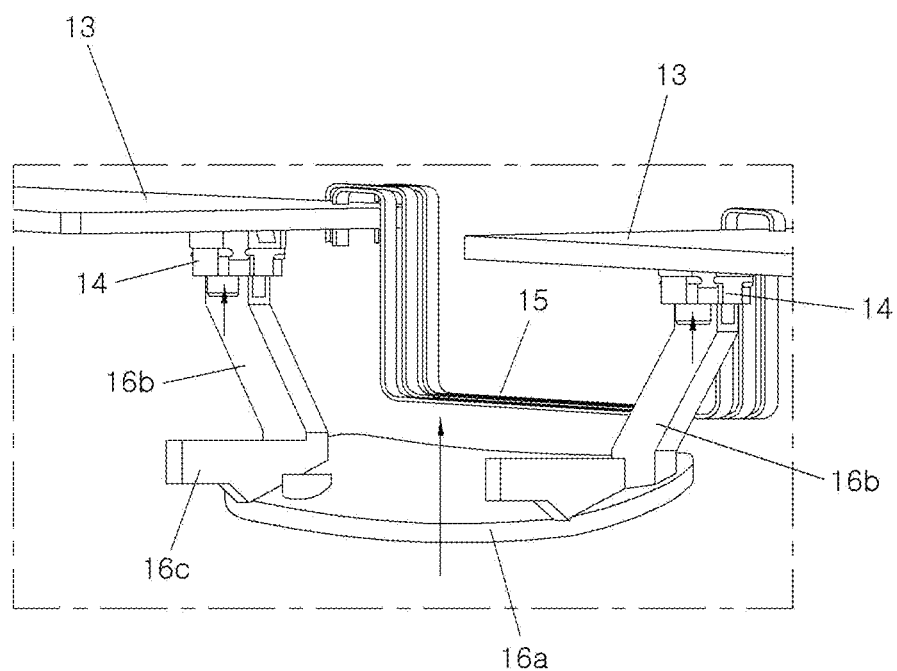

The support 16b is formed to extend from an end portion of the body 16a toward the switch 14 so as to transfer to the switch 14 the operating force of the user input to the body 16a. The substrates 13 are mounted in two and are spaces apart from each other and the supports 16b extend upward from both ends of the body 16a, respectively. An upper end of the support 16b is in contact with the switch 14 and when the actuator 16 is operated by the user, the support 16b presses the switch 14. An elastic body, such as a rubber damper (no reference numerals given), which acts as a buffer, may be provided between the upper end of the support 16b and the switch 14. Therefore, when the actuator 16 is lifted through the lower housing 12 (refer to FIG. 4B), the elastic body acts as a buffer between the switch 14 and the upper end of the support 16b.

Figure 5:
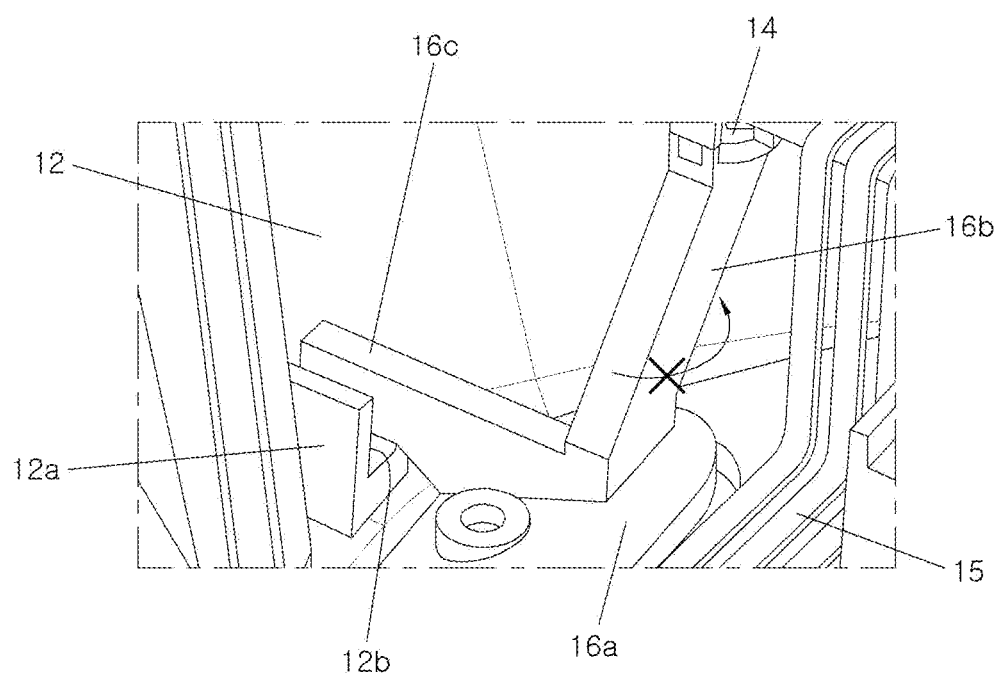
FIG. 5 is an enlarged perspective view showing a main portion of the integrated type outside handle switch assembly for a tail gate according to the present disclosure in a state in which a lower housing and the actuator are assembled to each other.

Meanwhile, when the actuator 16 is operated through the lower housing 12, in order to guide lifting and lowering of the actuator 16, an extension portion 16c is formed to extend to one side of the actuator 16 and the lower housing 12 is provided with a guide 12a that houses the extension portion 16c (refer to FIG. 5). The extension portion 16c extends in a cantilever form from the body 16a to the rear of the vehicle. The guide 12a is formed along a lifting and lowering direction of the actuator 16. An inner portion of the guide 12a is a slot 12b, which supports both surfaces of the extension portion 16c. The extension portions 16c may be formed at both ends of the body 16a, respectively. Correspondingly, the guides 12a may be formed in the lower housing 12 so as to be spaced apart from each other. Thus, the extension portion 16c is positioned at the inner portion of the slot 12b formed in respective guides 12a. The extension portion 16c is positioned at the inner portion of the slot 12b, and thus the extension portion 16c is lifted along the guide 12a. Further, operation directions of the actuator 16 and the support 16b are different from each other, so that the actuator 16 can rotate and it is possible for the actuator 16 to be prevented from rotating by the extension portion 16c and the guide 12a.

What is claimed is:

1. An integrated outside handle switch assembly for a tail gate, which is mounted in a tail gate to be opened and closed at a rear of a vehicle and operated at the time of opening the tail gate, the handle switch assembly comprising:
    an upper housing configured to be mounted on the tail gate;
    a lower housing configured to be assembled to the upper housing below the upper housing;
    substrates configured to be fixed at a lower portion of the upper housing;
    a switch configured to be operated at the time of opening the tail gate and mounted on the substrates; and
    a lamp configured to illuminate a license plate attached to the tail gate and mounted on the substrates,
    wherein a rear-view camera is mounted on the upper housing,
    wherein the substrates are installed on left and right sides of the camera, respectively,
    wherein an actuator transfers an operating force input to the switch by transferring the operating force input from the lower housing to the switch,
    wherein the actuator is mounted between the lower housing and the substrates,
    wherein the actuator is provided with a body in contact with the lower housing and provided with supports that extend upward from both ends of the body to the switch, respectively,
    wherein the actuator is provided with an extension portion extending in a cantilever form from the body to one side, and
    wherein the lower housing houses the extension portion and is provided with a guide that guides, lifts, and lowers the extension portion at the time of operating the actuator.

2. The handle switch assembly according to claim 1, wherein the substrates are electrically connected to each other.

3. The handle switch assembly according to claim 2, wherein the substrates are connected to each other by a cable.

4. The handle switch assembly according to claim 1, wherein the extension portion extends toward the rear of the vehicle.

5. The handle switch assembly according to claim 1, wherein the extension portions are formed at the both ends of the body, respectively, and
    wherein the guides are formed in the lower housing so as to be spaced apart from each other.

6. The handle switch assembly according to claim 1, wherein the camera is installed at a center of the upper housing in a width direction of the vehicle.

7. The handle switch assembly according to claim 1, wherein the upper housing is mounted above the license plate in the tail gate.

8. An integrated outside handle switch assembly for mounting to a rear tail gate or trunk lid of a vehicle, the handle switch assembly comprising:
    an upper housing configured to be mounted on the tail gate;
    a lower housing assembled to the upper housing below the upper housing;
    substrates fixed at a lower portion of the upper housing;
    a switch mounted on the substrates and configured to be operated at the time of opening the tail gate for releasing the tail gate; and
    a lamp mounted on the substrates and configured to illuminate a license plate attached to the tail gate,
    wherein a rear-view camera is mounted on the upper housing,
    wherein the substrates are installed on left and right sides of the camera, respectively,
    wherein an actuator transfers an operating force input to the switch by transferring the operating force input from the lower housing to the switch,
    wherein the actuator is mounted between the lower housing and the substrates,
    wherein the actuator is provided with a body in contact with the lower housing and provided with supports that extend upward from both ends of the body to the switch, respectively,
    wherein the actuator is provided with an extension portion extending in a cantilever form from the body to one side, and
    wherein the lower housing houses the extension portion and is provided with a guide that guides, lifts, and lowers the extension portion at the time of operating the actuator.

* * * * *